US012730686B2

(12) United States Patent
Griffin et al.

(10) Patent No.: US 12,730,686 B2
(45) Date of Patent: Sep. 8, 2026

(54) EXECUTION OF SERVICES IN DISTRIBUTED COMPUTING ENVIRONMENTS USING INITIAL RANDOM ACCESS MEMORY DISK SCHEMES

(71) Applicant: RED HAT, INC., Raleigh, NC (US)

(72) Inventors: Leigh Griffin, Waterford (IE); Eric Curtin, Charleville (IE)

(73) Assignee: Red Hat, Inc., Raleigh, NC (US)

( * ) Notice: Subject to any disclaimer, the term of this patent is extended or adjusted under 35 U.S.C. 154(b) by 535 days.

(21) Appl. No.: 18/212,388

(22) Filed: Jun. 21, 2023

(65) Prior Publication Data

US 2024/0427643 A1 Dec. 26, 2024

(51) Int. Cl.
*G06F 9/50* (2006.01)
*G06F 9/54* (2006.01)

(52) U.S. Cl.
CPC ............ *G06F 9/5083* (2013.01); *G06F 9/542* (2013.01)

(58) Field of Classification Search
CPC ...... G06F 9/5083; G06F 9/542; G06F 9/5022; G06F 9/5077; G06F 9/4401
See application file for complete search history.

(56) References Cited

U.S. PATENT DOCUMENTS 11,829,952 B1 * 11/2023 Hoehnen ............ G06Q 10/0631
2018/0349610 A1 * 12/2018 Gupta .................. G06F 9/5077
2022/0017648 A1 1/2022 Kameyama et al.
2022/0171648 A1 * 6/2022 Rodriguez .......... G06F 9/45533
2023/0012979 A1 * 1/2023 Vidyadhara ........... G06F 9/4401
2024/0070277 A1 * 2/2024 Ge ........................ G06F 21/602

FOREIGN PATENT DOCUMENTS

WO 2019180209 A1 9/2019

OTHER PUBLICATIONS

Zhai et al., “QuickStart: Booting VMs Faster in the Cloud”, https://pages.cs.wisc.edu/~yanzhai/papers/minicloud,pdf, 2018; pp. 1-6.

Red Hat, Inc., “Looking forward to Linux network configuration in the initial ramdisk (initrd)”, https://www.redhat.com/sysadmin/network-confi-initrd, Nov. 24, 2020; pp. 1-8.

SUSE Support., “How to add kernal modules to the initrd to be loaded on boot”, https://www.suse.com/support/kb/doc/?id=199445, Sep. 21, 2022; pp. 1-3.

Hudson, Trammell, “[PATCH v8 4/5] efi: Enable booting unified hypervisor/kernal/initrd images”, https://lore.kernel.org/all/20200930120011.1622924-5-hudson@trmm.net/, Sep. 26, 2022; pp. 1-9.

* cited by examiner

*Primary Examiner* — Peng Ke
(74) *Attorney, Agent, or Firm* — Kilpatrick Townsend & Stockton LLP

(57) ABSTRACT

Services can be executed on nodes using initial random access memory disk (initrd) schemes. For example, a system can receive, from an orchestrator node, a request to execute a service at a host node. The request can include data indicative of the service, and the host node can include an initrd scheme. The system can determine that the service is available for execution at the host node based on the service being included in the initrd scheme. In response to determining that the service is available, the system can further transmit a notification to the orchestrator node indicating that the service is available for execution at the host node. Additionally, the system can execute the service on the host node as part of executing the initrd scheme.

20 Claims, 6 Drawing Sheets

EXECUTION OF SERVICES IN DISTRIBUTED COMPUTING ENVIRONMENTS USING INITIAL RANDOM ACCESS MEMORY DISK SCHEMES

TECHNICAL FIELD

The present disclosure relates generally to distributed computing environments and, more particularly (although not necessarily exclusively), to executing services in distributed computing environments using initial random access memory disk schemes.

BACKGROUND

Distributed computing environments, such as cloud environments or resource constrained environments, can include various nodes (e.g., physical machines) to which workloads can be assigned. The workloads can represent demands or loads imposed on one or more nodes by software services. Thus, the workloads can refer to amounts or types of computing resources required to deploy the software services effectively. Software services can include microservices, applications, and serverless functions. Computing resources can be scaled up or down within the distributed computing environments to accommodate varying workloads of the software services. Scaling up can involve provisioning additional computing resources (e.g., nodes, containers, or virtual machines) and scaling down can involve releasing existing computing resources.

DETAILED DESCRIPTION

Figure 1:
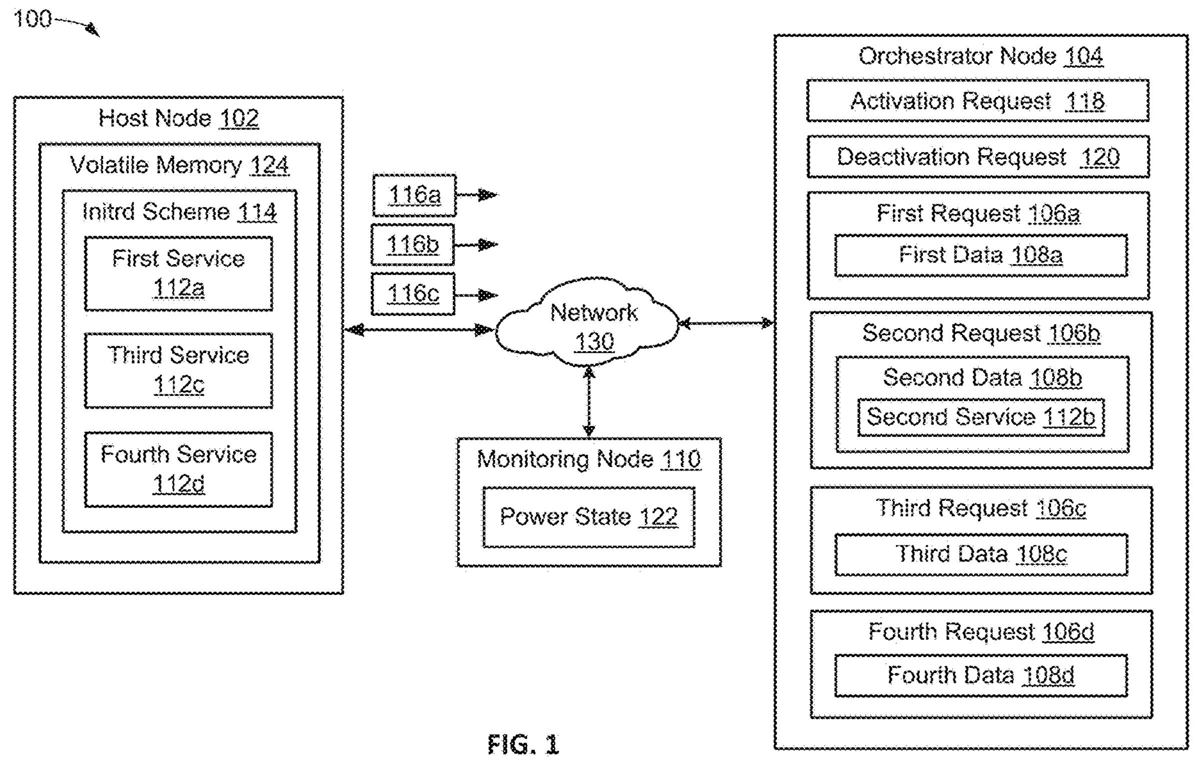
FIG. 1 is a block diagram of an example of a distributed computing environment for executing services using an initial random access memory disk (initrd) scheme according to some embodiments of the present disclosure.

It may be inefficient to scale computing resources up or down in distributed computing environments. For instance, it may be desirable to determine an availability of each node in a distributed computing environment so that the distributed computing environment can select nodes with sufficient capacity to handle a given workload of a software service. But conventional approaches to determining resource availability are often slow and can consume significant amounts of computing resources, such as processing power, memory, and network bandwidth. For example, the distributed computing environment may include a management module that can rapidly (e.g., once per millisecond) and repeatedly poll the nodes to determine resource availability. But such polling can consume a significant amount of network bandwidth and processing power.

Additionally, scaling computing resources can also be slow and consume significant amounts of computing resources. For example, to scale up, a new node may be provisioned (e.g., by creating a virtual machine or container). This can involve mounting a root filesystem and allocating computing resources such as CPU, memory, and storage for the new node. A service may then be deployed on the new node, which can require files to be loaded from the root filesystem, dependencies or prerequisites for the service to be installed, configuration parameters for the service to be set, or a combination thereof. This can consume a significant amount of time and computing resources. Due to these inefficiencies, the process of scaling can also be energy inefficient. For example, it may be necessary to keep nodes powered on to accommodate for the time to provision the node and deploy a service. Moreover, as a number of nodes increases in a distributed computing environment, communication and coordination between the nodes can impact an overall performance of the distributed computing system. In particular, the increase of nodes may introduce bottle necks, degrade response times, or cause other such issues within the distributed computing environment. Therefore, there can be a need for a means of efficiently of scaling resources to maintain energy efficiency, share resources effectively, ensure responsiveness, and to scale on-demand.

Some examples of the present disclosure can overcome one or more of the abovementioned problems by executing software services (also referred to herein as services) in distributed computing environments using initial random access memory disk (initrd) schemes. An initrd scheme can be a temporary file system used during a boot process of a host node. The services (e.g., networking services, hypervisors, containers, or filesystem mounting services for local and remote storage) can be built into the initrd scheme. Because the initrd scheme executes during the boot process of the host node, fast availability of the services can be performed on-demand. For example, the host node can indicate to an orchestrator node that a particular service is available based on the particular service being included in the initrd scheme. In this way, the availability of nodes can be determined efficiently. The orchestrator node can then request that the initrd load the particular service during the boot process of the node to facilitate the fast availability of the service on-demand. Additionally, due to the particular service being preinstalled in the initrd scheme, the loading of the particular service may involve installing dependencies or prerequisites or setting configuration settings to reduce latency in deploying and executing the service.

Additionally, building the services into the initrd scheme and loading the services during execution the initrd scheme may cause some increased latency for the execution of the initrd scheme or for the booting process of the host node. But, by loading the services from the initrd scheme, the services can be provisioned during the booting process of the host node. As a result, the services can be executed with reduced latency in comparison with conventional methods for executing services. As discussed above, in the conventional methods, files associated with the services can be stored in the root filing system, which may be mounted by the initrd scheme. Thus, in the conventional methods, the booting process would occur before the services can be loaded from the root filing system. Consequently, although the execution of the initrd scheme may experience some increased latency, the overall scaling of computing resources can be performed more efficiently.

The use of the initrd scheme can further enable the scaling of computing resources to be performed in an energy efficient manner. For example, because the services can be executed on-demand using the initrd scheme, the host nodes can be powered off for longer periods of time between use. Moreover, the initrd scheme and the services can run in volatile memory (e.g., random-access memory (RAM)) to reduce energy consumption compared with running in non-volatile memory. Volatile memory can be more energy efficient than non-volatile memory due to volatile memory being used for short term storage and due to the simplified circuitry of volatile memory. This may also decrease an impact of scaling the computing resources on the overall performance of the distributed computing environment. For example, because the initrd runs in volatile memory, a cleanly populated filesystem may be used at each execution of a service. Thus, data from previous executions of services cannot disrupt or impact a current execution of a service. Moreover, fewer computing resources may be required due to data associated with executing services not being stored long term. This can also reduce wear on a memory device (e.g., a disk) as no writes to the disk are performed during execution of services. The use of computing resources at each execution of a service can also be more focused as only the service requested will be initialized, cached, executed, or a combination thereof. The initrd scheme can further grant the host node with polymorphic capabilities. That is, the host node can execute any of the services, thereby enabling the host node to serve various roles within a distributed computing system.

In one particular example, an orchestrating node and a host node can be included in a cloud environment. The orchestrating node can be in charge of powering on and powering off the host node. The host node can be a server that includes an initrd scheme, which can be a temporary filesystem residing in RAM. Thus, services such as a networking service can be archived in the initrd scheme. The orchestrating node can prioritize providing external orchestrating nodes with network availability to a Linux environment contained in the initrd scheme.

Therefore, to provide the external orchestrating nodes with the network availability, the orchestrator node may power on the host node by activating a network protocol that enables the host node to be powered on over a network connection (e.g., Wake-on-LAN). After activating Wake-on-LAN, the orchestrator node may periodically a transmit requests for the host node to execute the networking service. Upon successful transmission of a request, the host node may receive data included in the request that is indicative of the networking service. The host node may then determine that the network service is available for execution based on the service being included in the initrd scheme.

After determining that the network service is available, the host node can transmit a notification to the orchestrator node indicating a success of the request (e.g., that the request was received and that the service is available). The host node may then execute the networking service as part of executing the initrd scheme. In doing so, the host node may load files necessary for executing the networking service as the host node is booting. As a result, the host node can quickly provide the networking service at the host node to efficiently scale up computing resources in the cloud environment.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a distributed computing environment 100 for executing services using an initial random access memory disk (initrd) scheme according to one example of the present disclosure. In some examples, the distributed computing environment 100 can be a cloud computing environment, a computing cluster, a data grid, or a resource constrained environment. The distributed computing environment 100 can include nodes that may be communicatively coupled to one another via one or more networks 130, such as a local area network or the Internet. The nodes can execute services to perform various types of workloads for clients. For example, the nodes may execute services configured to service virtualization workloads submitted by clients. Examples of the nodes can include computing devices, servers, virtual machines, or any combination of these.

The nodes may include an orchestrator node 104, a host node 102, and a monitoring node 110. The host node 102 can include an initrd scheme 114 in which services (e.g., a first service 112*a*, a third service 112*c*, and a fourth service 112*d*) can be preinstalled. In particular, the initrd scheme 114 can be a temporary file system used during a boot process of the host node 102 to initialize the system, mount a root filing system, or performing other suitable operations during the boot process. Additionally, the orchestrator node 104 can be in charge of powering on or powering off the host node 102. The initrd scheme 114 may be loaded at a point in time corresponding to when the orchestrator node 104 powers on the host node 102. The monitoring node 110 may monitor the distributing computing environment 100 for free nodes (e.g., the host node 102). The monitoring node 110 may further detect a power state 122 of the host node, and may transmit an indication of the power state 122 to the orchestrator node 104.

Due to the initrd scheme 114 including the first service 112*a*, the third service 112*c*, and the fourth service 112*d*, the host node 102 can execute the services on-demand. In some examples, the host node 102 can execute the services via an orchestrator-to-host mode. In orchestrator-to-host mode, the orchestrator node 104 may request that the host node 102 perform a service without knowledge of which services are included in the initrd scheme 114.

For example, the orchestrator node 104 can monitor system performance of the distributed computing environment 100. The orchestrator node 104 may determine, based on the system performance, that the host node 102 should execute a first service 112*a*. In particular, the orchestrator node 104 may detect that a significant increase in a number of users of a software application is causing a decrease in system performance of the distributed computing environment 100. For example, the increase in users may be causing latency in data processing within the distributed computing environment 100. Thus, a scaling up of resources in the distributed computing environment 100 may be performed to deploy additional containers with the software application.

To do so, the orchestrator node 104 may transmit an activation request 118 to the host node 102 to cause the host node 102 to power on. The orchestrator node 104 may also transmit a first request 106*a* for the host node 102 to execute the first service 112*a*. The first request 106*a* can include first data 108*a* indicative of the first service 112*a*, which can be a container service capable of deploying the software application. The host node 102 can then determine that the first service 112*a* is available for execution due to the first service 112*a* being included in the initrd scheme 114. As a result of determining that the first service 112*a* is available, the host node 102 can transmit a first notification 116*a* to indicate to the orchestrator node 104 that the first service 112*a* is available. The host node 102 can also execute the first service 112*a* as part of executing the initrd scheme 114. That is, files for deploying the container service at the host node 102 can be downloaded from the initrd scheme 114 during a booting process for the host node 102.

In another example, the orchestrator node 104 can determine that the host node 102 should execute a second service 112*b*. For example, a number of users of the software application may decrease, therefore the orchestrator node 104 may detect that the first service 112*a* is no longer needed. As a result, the orchestrator node 104 may transmit a deactivation request 120 to cause the host node 102 to terminate execution of the first service 112*a*. The deactivation request 120 may further cause the host node 102 to power off. Additionally, due to the initrd scheme 114 and the first service 112*a* executing from volatile memory 124 of the host node 102, the deactivation request 120 can cause data associated with the execution of the first service 112*a* to be removed from the host node 102.

Then, as a result of determining that the host node 102 should execute the second service 112*b*, the orchestrator node 104 may transmit the activation request 118 and a second request 106*b* for the host node 102 to execute the second service 112*b*. The second request 106*b* can include second data 108*b* to indicate to the host node 102 that execution of the second service 112*b* is desired. The host node 102 may determine that the second service 112*b* is unavailable based on the second service 112*b* not being included in the initrd scheme 114. As a result, the host node 102 can transmit a second notification 116*b* to the orchestrator node 104. The second notification 116*b* can alert the orchestrator node 104 that the second service 112*b* is not available. The second notification 116*b* may further indicate the services that are available, such as the first service 112*a*, the third service 112*c*, and the fourth service 112*d*. The orchestrator node 104 may then transmit a third request 106*c* for the host node 102 to execute a third service 112*c*. In response, the host node 102 can execute the third service 112*c* as part of executing the initrd scheme 114.

Additionally or alternatively, the host node 102 can execute services using the initrd scheme 114 in an host-to-orchestrator mode. In host-to-orchestrator mode, the orchestrator node 104 may request that the host node 102 perform a service after receiving an indication of the services that are included in the initrd scheme 114. The host-to-orchestrator mode may be implemented when monitoring of the host node 102 by orchestrator node 104 is limited due to, for example, a security protocol of the host node 102. Due to the limited monitoring abilities of the orchestrator node 104, the monitoring node 110 may be used as an alternative means of monitoring the host node 102, powering on or powering off the host node 102, or a combination thereof.

Thus, in an example, the monitoring node 110 can be monitoring the host node 102 to determine the power state 122 of the host node 102 and can transmit the power state 122 to the orchestrator node 104. The orchestrator node 104 may receive the power state 122, which may indicate that the host node is powered off. In response, the orchestrator node 104 may transmit a request for the monitoring node 110 to power on the host node 102. Once the host node 102 is powered on, the host node 102 may the transmit a third notification 116*c* to the orchestrator node 104 indicating the services that are available. The orchestrator node 104 may then determine that one of the services should be executed. For example, the orchestrator node 104 may detect that execution of a fourth service 112*d*, which can be a networking service, can improve data transmission within the distributed computing environment 100. Thus, the orchestrator node can transmit a fourth request 106*d* for the host node 102 to execute the fourth service 112*d*. The host node 102 can then execute the fourth service 112*d* as part of executing the initrd scheme 114.

Therefore, in response to the orchestrator node 104 transmitting the first and second requests 106*a-b* or the host node 102 transmitting the third notification 116*c*, available services can be determined in an efficient manner based on which services are preinstalled in the initrd scheme 114. Then, the services can be deployed, executed, or a combination thereof during the execution of the initrd scheme 114. In this way, computing resources at the host node can be used more efficiently. For example, less storage space and energy may be used due to the initrd scheme 114 and the services executing in the volatile memory 124. Additionally, latency in scaling of computing resources within the distributed computing environment 100 can be reduced as the execution of the services can occur during the boot process of the host node 102 rather than after.

Figure 2:
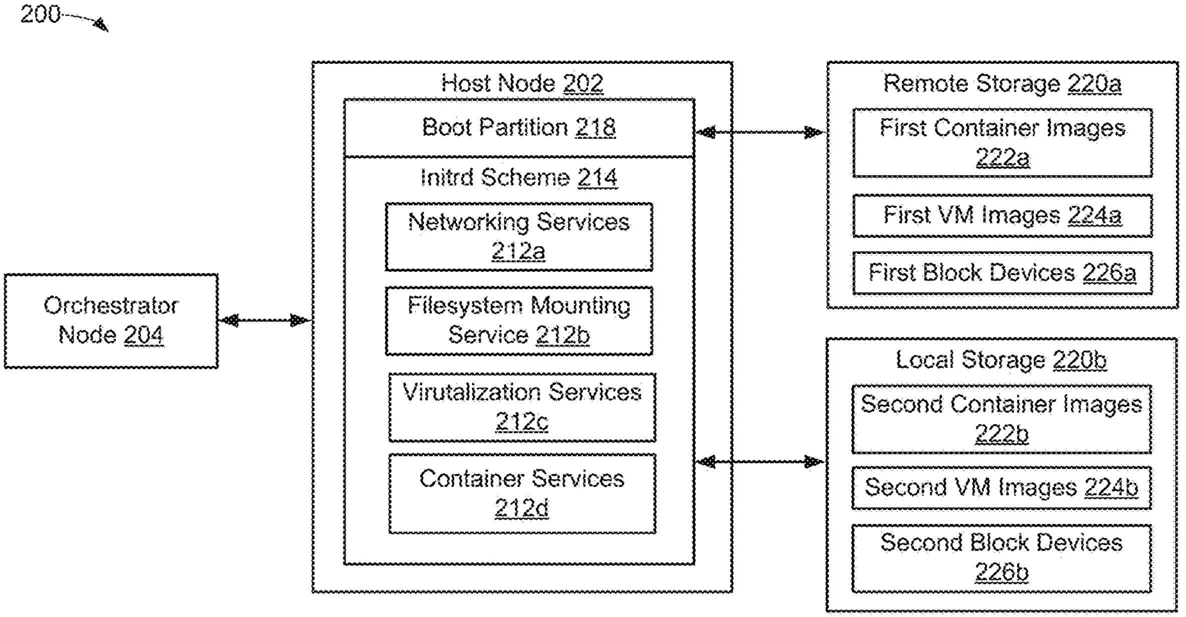
FIG. 2 is a block diagram of another example of a distributed computing environment for executing services using an initrd scheme according to some embodiments of the present disclosure.

FIG. 2 is a block diagram of another example of a distributed computing environment 200 for executing services 212*a-d* using an initial random access memory disk (initrd) scheme 214 according to one example of the present disclosure. The distributed computing environment can include an orchestrator node 204 and a host node 202. The orchestrator node 204 can coordinate powering on or powering off the host node 202 as part of scaling up or scaling down computing resources in the distributed computing environment 200. To do so, the orchestrator node 204 may transmit an activation request or a deactivation request to the host node 202. In a particular example, the orchestrator node 204 may use Wake-on-Lan to transmit the activation or deactivation requests. Wake-on-Lan can be a network protocol that enables the host node 202 to be powered on or off over a network connection between the host node 202 and the orchestrator node 204.

Additionally, the host node 202 can include boot partition 218, which can be a dedicated partition on a storage device (e.g., a disk) that contains files associated with a booting process of an operating system. The boot partition 218 can include components for starting the host node 202 and for loading the operating system, such as initrd scheme 114. In an example, a booting process for a Linux operating system of the host node 202 can include the orchestrator node 204 causing the host node 202 to power on. Then, firmware of the host node 202 can load, a kernel can load, and the initrd scheme 214 can load. The initrd scheme 214 can be characterized by fast loading, and can be a temporary filesystem for initializing the system, mounting a root file system, or performing other suitable operations during the boot process.

The initrd scheme 214 can further include services 212*a-d*, which can be loaded from the initrd scheme 214 and executed at the host node 202. The services 212*a-d* can include a networking services 212*a* for providing network capabilities or performing other suitable networking service. The services 212*a-d* can also include a filesystem mounting service 212*b* for mounting the root file system at the host node 202. Additionally, the services 212*a*-*d* can include virtualization services 212*c* for deploying virtual machines or performing other suitable virtualization services and container services 212*d* for deploying containers or performing other suitable container services.

Additionally, the host node 202 can include local storage 320*b*, which can be part of the host node 202 itself, such as part of the storage device with the boot partition 218. The host node 202 may also be communicatively coupled to remote storage 220*a*. The remote storage 220*a* can be part of a second node, such as a server or other suitable node, which can communicate with the host node 202 via a network. In particular, the host node 202 may communicate with the second node to retrieve information from the remote storage 220*a* via communication protocols. Examples of the communication protocols can include Non-Volatile Memory Express (NVMe), Transmission Control Protocol (TCP), Internet Small Computer System Interface (ISCSI), Fibre Channel (FC), or other suitable communication protocols.

The remote storage 220*a* can include first container images 222*a*, first virtual machine (VM) images 224*a*, and first block devices 226*a*. Additionally, the local storage 320*b* can include second container images 222*b*, second VM images 224*b*, and second block devices 226*b*. The container images 222*a*-*b* can include components (e.g., application code, dependencies, or metadata) for deploying applications in containers. Similarly, the VM images 224*a*-*b* can include components (software applications or software configuration files) for deploying virtual machines. Moreover, the block devices 226*a*-*b* can include fixed blocks of data that may be associated with any of the services 212*a*-*d*.

The initrd scheme 214 may load the container images 222*a*-*b*, the VM images 224*a*-*b*, or block data from the block devices 226*a*-*b* from the remote storage 220*a* or the local storage 220*b* during the booting process of the host node 202. In doing so, the services 212*a*-*d* can be employed at the host node 202 in an efficient manner. For example, the distributed computing environment 200 can be a resource constrained environment, and the orchestrator node 204 may detect a need to deploy a virtual machine in the resource constrained environment. Thus, the orchestrator node 204 may transmit a request for the host node 202 to execute a virtualization service of the virtualization services 212*c*. The host node 202 can determine that the virtualization service is included in the initrd scheme 214, and therefore can be executed. The host node 202 can then transmit a notification to the orchestrator node 204 to indicate that the virtualization service is available.

The host node 202 can further execute the virtualization service as part of executing the initrd scheme 214. For example, during the booting process of the host node 202, the initrd scheme 214 may being executing to mount the root filing system and to load a VM image corresponding to the virtualization service. As a result, a virtual machine can be deployed at the host node 202 to scale up computing resources in the resource constrained environment in an efficient manner.

Figure 3:
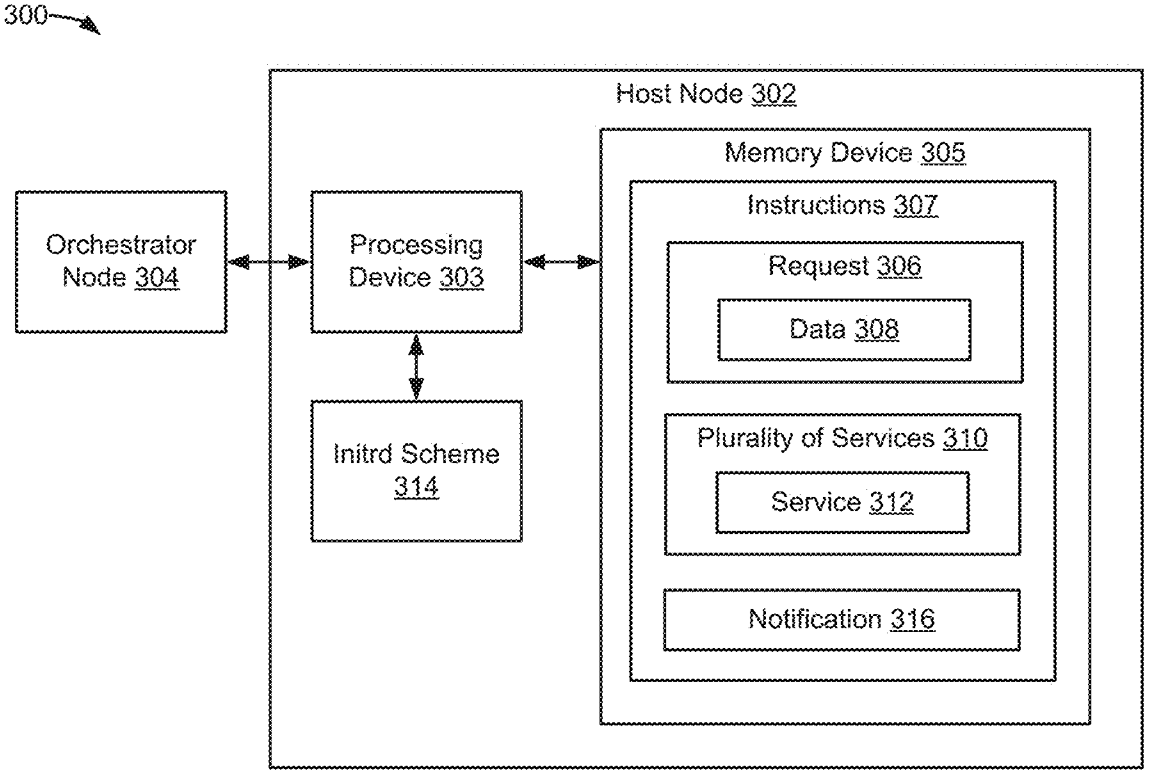
FIG. 3 is a block diagram of an example of a plurality of nodes for executing services using an initrd scheme according to some embodiments of the present disclosure.

FIG. 3 is a block diagram of an example of a plurality of nodes 300 for executing services using an initial random access memory disk (initrd) scheme 314 according to one example of the present disclosure. The plurality of nodes 300 can include nodes such as a host node 302 and an orchestrator node 304. Additionally, the plurality of nodes 300 includes a processing device 303 communicatively coupled to a memory device 305. In some examples, the components of the plurality of nodes 300, such as the processing device 303 and the memory device 305, may be part of a same computing device, such as the host node 302. In other examples, the processing device 303 and the memory device 305 can be included in separate computing devices that are communicatively coupled.

The processing device 303 can include one processing device or multiple processing devices. Non-limiting examples of the processing device 303 can include a Field-Programmable Gate Array (FPGA), an application-specific integrated circuit (ASIC), and a microprocessor. The processing device 303 can execute instructions 307 stored in the memory device 305 to perform computing operations. In some examples, the instructions 307 can include processor-specific instructions generated by a compiler or an interpreter from code written in any suitable computer-programming language, such as C, C++, C#, etc.

The memory device 305 can include one memory or multiple memories. The memory device 305 can be non-volatile and may include any type of memory that retains stored information when powered off. Non-limiting examples of the memory device 305 include electrically erasable and programmable read-only memory (EEPROM), flash memory, or any other type of non-volatile memory. At least some of the memory device 305 can include a non-transitory computer-readable medium from which the processing device 303 can read instructions 307. A computer-readable medium can include electronic, optical, magnetic, or other storage devices capable of providing the processing device 303 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 307.

In some examples, the processing device 303 can execute the instructions 307 to perform some or all of the functionality described herein. For example, the processing device 303 can receive, from the orchestrator node 304 of the plurality of nodes 300, a request 306 to execute a service 312 at the host node 302 of the plurality of nodes 300. The request 306 can include data 308 indicative of the service 312, and the host node 302 can include an initrd scheme 314. The processing device 303 can further determine that the service 312 is available for execution at the host node 302 based on the service 312 being included in the initrd scheme 314. Then, in response to determining that the service 312 is available, the processing device 303 can transmit a notification 316 to the orchestrator node 304 indicating that the service 312 is available for execution at the host node 302. Additionally, the processing device 313 can execute the service 312 on the host node 302 as part of executing the initrd scheme 314.

Figure 4:
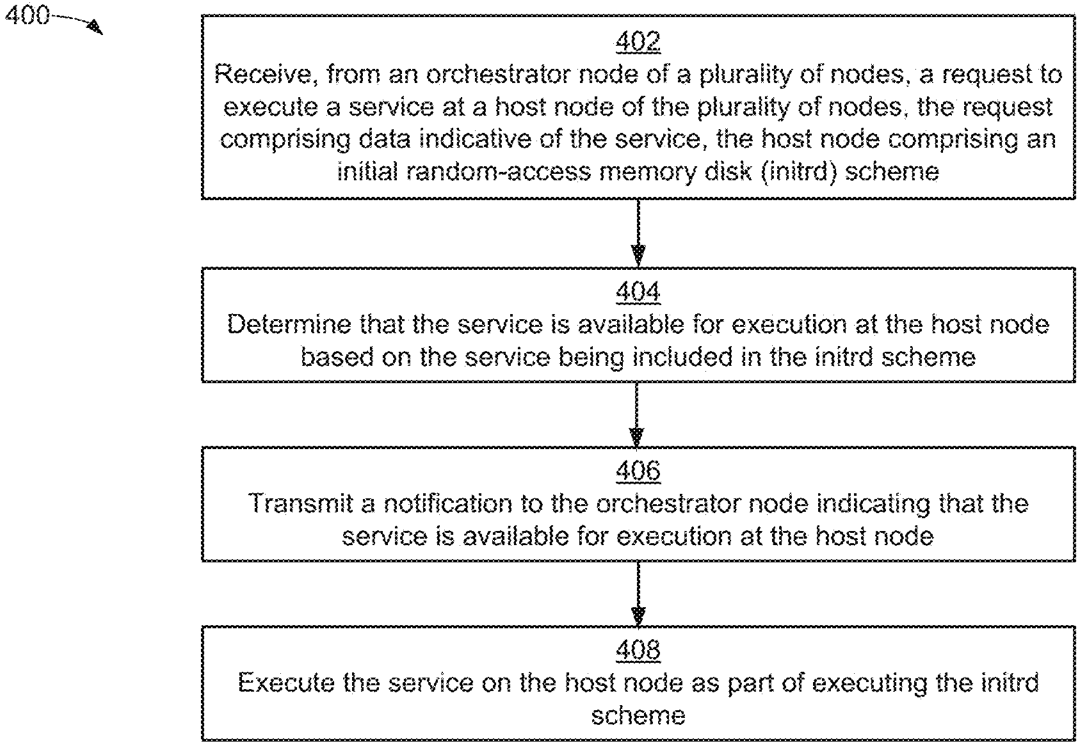
FIG. 4 is a flowchart of an example of a process for executing services using an initrd scheme according to some embodiments of the present disclosure.

FIG. 4 is a flowchart of an example of a process 400 for executing services using an initial random access memory disk (initrd) scheme according to one example of the present disclosure. The process 400 of FIG. 4 can be implemented by the host node 102 of FIG. 1, the host node 202 of FIG. 2, or the processing device 303 of FIG. 3, but other implementations are also possible. While FIG. 4 depicts a certain sequence of steps for illustrative purposes, other examples can involve more steps, fewer steps, different steps, or a different order of the steps depicted in FIG. 4. The steps of FIG. 4 are described below with reference to the components of FIGS. 1-3 described above.

At block 402, the processing device 303 can receive, from an orchestrator node 304 of a plurality of nodes, a request 306 to execute a service 312 at a host node 302 of the plurality of nodes. The request 306 can comprise data 308 indicative of the service 312, and the host node 302 can comprise an initrd scheme 314. In an example, the orchestrator node 304 can detect that a workload on a distributed computing system has increased. It can be desirable to scale up computing resources by deploying one or more virtual machines on the host node 302 to handle increased processing and storage requirements of the workload. Therefore, in the example, the request 306 can be a request to execute a virtualization service at the host node. The virtualization service may be able to partition the host node into the one or more virtual machines to scale up the computing resources.

At block 404, the processing device 303 can determine that the service 312 is available for execution at the host node 302 based on the service being included in the initrd scheme 314. In the example, the initrd scheme 314 can correspond to the initrd scheme 214 of FIG. 2. Thus, the initrd scheme 314 can include networking services 212*a*, a filesystem mounting service 212*b*, virtualization services 212*c*, container services 212*d*. The processing device 303 can determine that the initrd scheme 314 includes the virtualization service based on the virtualization service being included in the virtualization services 212*c*.

At block 406, the processing device 303 can transmit a notification 316 to the orchestrator node 304 indicating that the service 312 is available for execution at the host node 302. The processing device 303 can transmit the notification 316 in response to determining that the service 312 is available. In the example, the notification 316 can indicate that the virtualization service is available. The notification 316 may further indicate to the orchestrator node 304 that the request 306 was received successfully.

At block 408, the processing device 303 can execute the service 312 on the host node 302 as part of executing the initrd scheme 314. For example, the processing device 303 can cause the host node 302 to load files, a VM image, or a combination thereof associated with executing the virtualization service from the initrd scheme 314 as the host node 302 is booting. Thus, the booting of the host node 302 and the provisioning and deploying of the one or more virtual machines at the host node 302 may occur at the same time or within a close timeframe to facilitate efficient scaling up of computing resources.

Figure 5:
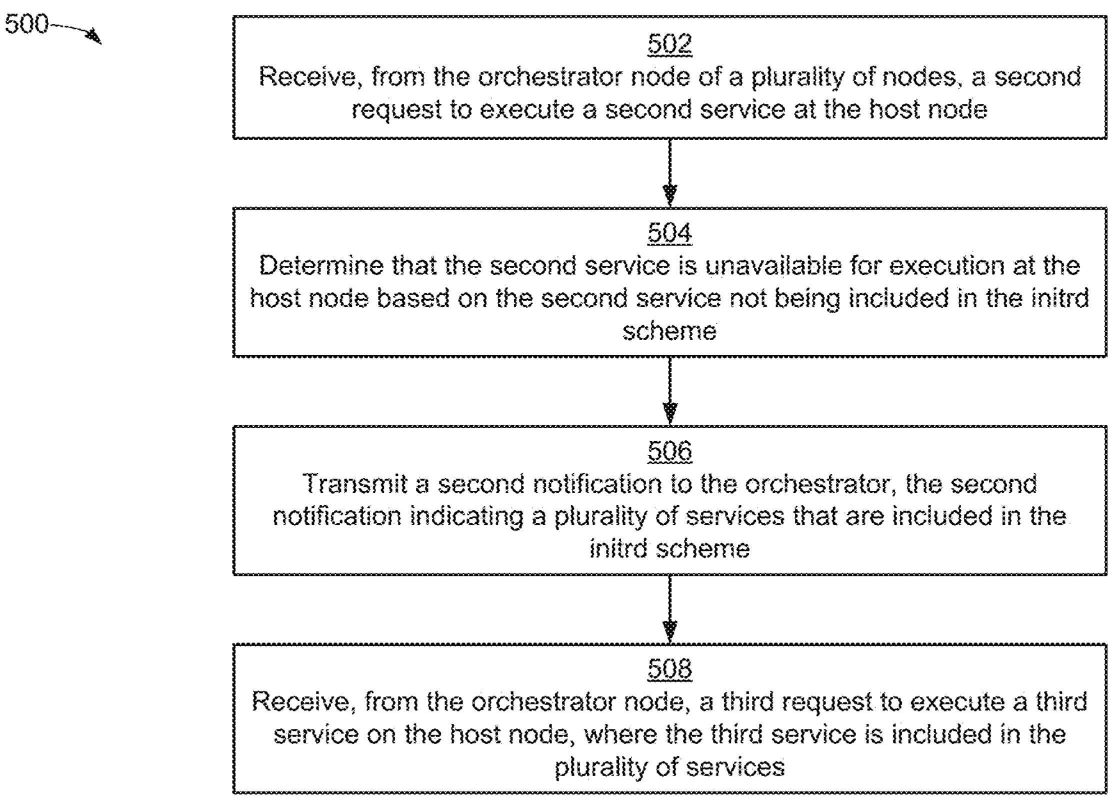
FIG. 5 is a flowchart of another example of a process for executing services using an initrd scheme according to some embodiments of the present disclosure.

FIG. 5 is a flowchart of another example of a process 500 for executing services using an initial random access memory disk (initrd) scheme according to one example of the present disclosure. The process 500 of FIG. 5 can be implemented by the host node 102 of FIG. 1, the host node 202 of FIG. 2, or the processing device 303 of FIG. 3, but other implementations are also possible. While FIG. 5 depicts a certain sequence of steps for illustrative purposes, other examples can involve more steps, fewer steps, different steps, or a different order of the steps depicted in FIG. 5. The steps of FIG. 5 are described below with reference to the components of FIGS. 1-3 described above.

At block 502, the processing device 303 can receive, from the orchestrator node 104 of a plurality of nodes, a second request 106*b* to execute a second service 112*b* at the host node 102. The second request 106*b* can include second data 108*b* indicative of the second service 112*b*, and the host node 102 can comprise an initrd scheme 114. Additionally, in an example, the orchestrator node 304 can be scaling up resources in response to receiving a large data set. Therefore, in the example, the second request 106*b* to execute a second service 112*b* can be a request to execute a container service at the host node 102.

At block 504, the processing device 303 can determine that the second service 112*b* is unavailable for execution at the host node 102 based on the second service 112*b* not being included in the initrd scheme 114. For example, a first service 112*a*, a third service 112*c*, and a fourth service 112*d* can be preinstalled in the initrd scheme 114. But, the initrd scheme 114 may not include the second service 112*b* (e.g., the container service).

At block 506, the processing device 303 can transmit a second notification 116*b* to the orchestrator node 104. The second notification 116*b* can indicate a plurality of services that are included in the initrd scheme 114. Thus, in the example, the second notification 116*b* can indicate that the first service 112*a*, the third service 112*c*, and the fourth service 112*d* are included in the initrd scheme 114.

At block 508, the processing device 303 can receive, from the orchestrator node 104, a third request 106*c* to execute the third service 112*c* on the host node 102, where the third service 112*c* is included in the plurality of services. For example, the orchestrator node 104 can detect that a virtualization service can also be used to improve the ability of the distributed computing environment 100 to process the large data set. Thus, the orchestrator node 104 can request that the processing device 303 execute the third service 112*c* (e.g., the virtualization service). In response, the processing device 303 can execute the third service 112*c* on the host node 102 as part of executing the initrd scheme 114.

Figure 6:
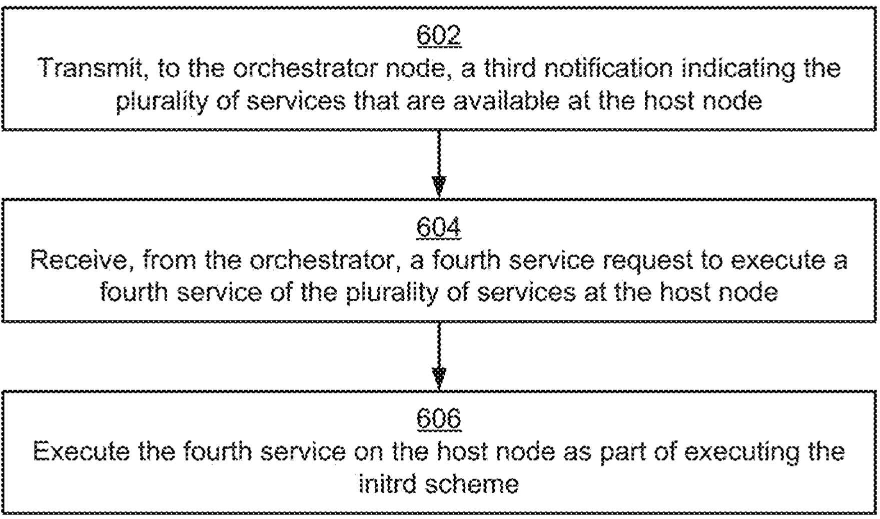
FIG. 6 is a flowchart of another example of a process for executing services using an initrd scheme according to some embodiments of the present disclosure.

FIG. 6 is a flowchart of another example of a process 600 for executing services using an initial random access memory disk (initrd) scheme according to one example of the present disclosure. The process 600 of FIG. 6 can be implemented by the host node 102 of FIG. 1, the host node 202 of FIG. 2, or the processing device 303 of FIG. 3, but other implementations are also possible. While FIG. 6 depicts a certain sequence of steps for illustrative purposes, other examples can involve more steps, fewer steps, different steps, or a different order of the steps depicted in FIG. 6. The steps of FIG. 6 are described below with reference to the components of FIGS. 1-3 described above.

At block 602, the processing device 303 can transmit, to the orchestrator node 104, a third notification 116*c* indicating a plurality of services that are available at the host node 102. For example, the orchestrator node 104 can request that a monitoring node 110 power on the host node 102. After being powered on, the host node may automatically transmit the third notification 116*c* to the orchestrator node 104, which may include a first service 112*a*, a third service 112*c*, and a fourth service 112*d*.

At block 604, the processing device 303 can receive, from the orchestrator node 104, a fourth request 106*d* to execute a fourth service 112*d* of the plurality of services at the host node 102. The orchestrator node 104 can transmit the fourth request 106*d* based on the third notification 116*c*. For example, the host node 102 may include security measures (e.g., a fire wall) that may prevent the orchestrator node 104 from powering on, powering off, monitoring a power state 122 of, or a combination thereof the host node 102. Thus, the orchestrator node 104 may not be able to detect that a request can be transmitted to the host node 102 until the processing device 303 transmits the third notification 116*c*.

At block 606, the processing device 303 can execute the fourth service 112*d* on the host node 102 as part of executing the initrd scheme 114. For example, the processing device 303 can cause the host node 102 to load files, images, or a combination thereof associated with executing the fourth service 112*d* from the initrd scheme 114 as the host node 102 is booting.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a memory device that includes instructions executable by the processing device for causing the processing device to perform operations comprising:

receiving, from an orchestrator node of a plurality of nodes, an activation request configured to cause a host node of the plurality of nodes to power on;

receiving, from the orchestrator node and subsequent to the host node powering on, a request to execute a service at the host node, the request comprising data indicative of the service, the host node comprising an initial random-access memory disk (initrd) scheme;

determining, based on the data indicative of the service, whether one or more files for executing the service are preinstalled in the initrd scheme;

in response to determining that the one or more files are preinstalled in the initrd scheme:

transmitting a notification to the orchestrator node indicating that the service is available for execution at the host node; and performing a boot process to provision the host node, wherein performing the boot process comprises loading the one or more files of the service to execute the service on the host node as part of executing the initrd scheme.

2. The system of claim 1, wherein the request is a first request, the service is a first service, the notification is a first notification, and wherein the memory device further includes instructions executable by the processing device for causing the processing device to perform operations comprising:

receiving, from the orchestrator node, a second request to execute a second service at the host node;

determining that second files for executing the second service are not preinstalled in the initrd scheme;

in response to determining that the second files are not preinstalled in the initrd scheme, transmitting a second notification to the orchestrator node, the second notification indicating files for a plurality of services that are included in the initrd scheme; and subsequent to transmitting the second notification, receiving, from the orchestrator node, a third request to execute a third service on the host node, where the third service is included in the plurality of services.

3. The system of claim 1, wherein the request is a first request, the service is a first service, the notification is a first notification, and wherein the memory device further includes instructions executable by the processing device for causing the processing device to perform operations comprising:

transmitting, to the orchestrator node, a third notification indicating that files for executing a plurality of services are preinstalled in the initrd scheme;

in response to transmitting the third notification, receiving, from the orchestrator node, a fourth request to execute a fourth service of the plurality of services at the host node; and in response to the fourth request, loading fourth files for the fourth service on the host node as part of executing the initrd scheme.

4. The system of claim 3, wherein the memory device further includes instructions executable by the processing device for causing the processing device to perform operations comprising:

prior to transmitting the third notification, detecting, by a monitoring node of the plurality of nodes, a power state of the host node, wherein the monitoring node is configured to transmit an indication of the power state of the host node to the orchestrator node, and wherein the monitoring node is configured to power on or power off the host node.

5. The system of claim 1, wherein the orchestrator node is configured to monitor system performance of the plurality of nodes, and wherein the orchestrator node is configured to transmit the activation request and the request to execute the service based on the system performance.

6. The system of claim 1, wherein the service is executed from volatile memory of the host node.

7. A computer-implemented method comprising:

receiving, from an orchestrator node of a plurality of nodes, an activation request configured to cause a host node of the plurality of nodes to power on;

receiving, from the orchestrator node and subsequent to the host node powering on, a request to execute a service at the host node, the request comprising data indicative of the service, the host node comprising an initial random-access memory disk (initrd) scheme;

determining, based on the data indicative of the service, whether one or more files for executing the service are preinstalled in the initrd scheme;

in response to determining that the one or more files are preinstalled in the initrd scheme:

transmitting a notification to the orchestrator node indicating that the service is available for execution at the host node; and performing a boot process to provision the host node, wherein performing the boot process comprises loading the one or more files of the service to execute the service on the host node as part of executing the initrd scheme.

8. The computer-implemented method of claim 7, wherein the request is a first request, the service is a first service, the notification is a first notification, and wherein the computer-implemented method further comprises:

receiving, from the orchestrator node, a second request to execute a second service at the host node;

determining that second files for executing the second service are not preinstalled in the initrd scheme;

in response to determining that the second files are not preinstalled in the initrd scheme, transmitting a second notification to the orchestrator node, the second notification indicating files for a plurality of services that are included in the initrd scheme; and subsequent to transmitting the second notification, receiving, from the orchestrator node, a third request to execute a third service on the host node, where the third service is included in the plurality of services.

9. The computer-implemented method of claim 7, wherein the request is a first request, the service is a first service, the notification is a first notification, and wherein the computer-implemented method further comprises:

transmitting, to the orchestrator node, a third notification indicating that files for executing a plurality of services are preinstalled in the initrd scheme;

in response to transmitting the third notification, receiving, from the orchestrator node, a fourth request to execute a fourth service of the plurality of services at the host node; and in response to the fourth request, loading fourth files for the fourth service on the host node as part of executing the initrd scheme.

10. The computer-implemented method of claim 9, further comprising:

prior to transmitting the third notification, detecting, by a monitoring node of the plurality of nodes, a power state of the host node, wherein the monitoring node is configured to transmit an indication of the power state of the host node to the orchestrator node, and wherein the monitoring node is configured to power on or power off the host node.

11. The computer-implemented method of claim 7, wherein the orchestrator node is configured to monitor system performance of a system that comprises the plurality of nodes, and wherein the orchestrator node transmits the activation request and the request to execute the service based on the system performance.

12. The computer-implemented method of claim 7, wherein the service is executed from volatile memory of the host node.

13. A non-transitory computer-readable medium comprising instructions that are executable by a processing device for causing the processing device to perform operations comprising:

receiving, from an orchestrator node of a plurality of nodes, an activation request configured to cause a host node of the plurality of nodes to power on;

receiving, from the orchestrator node and subsequent to the host node powering on, a request to execute a service at the host node, the request comprising data indicative of the service, the host node comprising an initial random-access memory disk (initrd) scheme;

determining, based on the data indicative of the service, whether one or more files for executing the service are preinstalled in the initrd scheme;

in response to determining that the one or more files are preinstalled in the initrd scheme:

transmitting a notification to the orchestrator node indicating that the service is available for execution at the host node; and performing a boot process to provision the host node, wherein performing the boot process comprises loading the one or more files of the service to execute the service on the host node as part of executing the initrd scheme.

14. The non-transitory computer-readable medium of claim 13, wherein the request is a first request, the service is a first service, the notification is a first notification, and further comprising instructions executable by the processing device for causing the processing device to perform operations comprising:

receiving, from the orchestrator node, a second request to execute a second service at the host node;

determining that second files for executing the second service are not preinstalled in the initrd scheme;

in response to determining that the second files are not preinstalled in the initrd scheme, transmitting a second notification to the orchestrator node, the second notification indicating files for a plurality of services that are included in the initrd scheme; and subsequent to transmitting the second notification, receiving, from the orchestrator node, a third request to execute a third service on the host node, where the third service is included in the plurality of services.

15. The non-transitory computer-readable medium of claim 13, wherein the request is a first request, the service is a first service, the notification is a first notification, and further comprising instructions executable by the processing device for causing the processing device to perform operations comprising:

transmitting, to the orchestrator node, a third notification indicating that files for executing a plurality of services are preinstalled in the initrd scheme;

in response to transmitting the third notification, receiving, from the orchestrator node, a fourth request to execute a fourth service of the plurality of services at the host node; and in response to the fourth request, loading fourth files for the fourth service on the host node as part of executing the initrd scheme.

16. The non-transitory computer-readable medium of claim 15, further comprising instructions executable by the processing device for causing the processing device to perform operations comprising:

prior to transmitting the third notification, detecting, by a monitoring node of the plurality of nodes, a power state of the host node, wherein the monitoring node is configured to transmit an indication of the power state of the host node to the orchestrator node, and wherein the monitoring node is configured to power on or power off the host node.

17. The non-transitory computer-readable medium of claim 13, wherein the orchestrator node is configured to monitor system performance of a system that comprises the plurality of nodes, and wherein the orchestrator node transmits the activation request and the request to execute the service based on the system performance.

18. The non-transitory computer-readable medium of claim 13, wherein the service is executed from volatile memory of the host node.

19. The system of claim 1, wherein the memory device further includes instructions executable by the processing device for causing the processing device to execute the initrd scheme by setting a configuration parameter for the one or more files.

20. The system of claim 1, wherein the service comprises a networking service.

* * * * *